United States Patent [19]

Narita

[11] Patent Number: 4,972,738
[45] Date of Patent: Nov. 27, 1990

[54] LINE PRESSURE CONTROL ARRANGEMENT FOR AUTOMATIC AUTOMOTIVE TRANSMISSION

[75] Inventor: Yasushi Narita, Yokohama, Japan

[73] Assignee: Nissan Motor Co., Ltd., Yokohama, Japan

[21] Appl. No.: 336,430

[22] Filed: Apr. 11, 1989

[30] Foreign Application Priority Data

Apr. 11, 1988 [JP] Japan .................................. 63-87389

[51] Int. Cl.$^5$ ............................................. B60K 41/06
[52] U.S. Cl. ....................................................... 74/866
[58] Field of Search ................. 74/866, 867; 192/3.58, 192/109 F

[56] References Cited

U.S. PATENT DOCUMENTS

| | | | |
|---|---|---|---|
| 4,283,970 | 8/1981 | Vukovich | 74/866 |
| 4,476,745 | 10/1984 | Moan | 74/866 |
| 4,653,350 | 3/1987 | Downs et al. | 74/864 |
| 4,680,992 | 7/1987 | Hayasaki et al. | 74/869 |
| 4,722,247 | 2/1988 | Shindo et al. | 74/866 |
| 4,730,519 | 3/1988 | Nakamura et al. | 74/866 |
| 4,742,461 | 5/1988 | Eschrich et al. | 364/424.1 |
| 4,795,011 | 1/1989 | Ushijima et al. | 192/3.58 X |
| 4,805,750 | 2/1989 | Nitz | 192/3.58 |
| 4,831,899 | 5/1989 | Honig | 74/867 |
| 4,855,913 | 8/1989 | Brekkestran | 74/866 X |

FOREIGN PATENT DOCUMENTS 3327500 2/1985 Fed. Rep. of Germany .
3443038 6/1986 Fed. Rep. of Germany .

OTHER PUBLICATIONS

Nissan Service Manual, Nissan Motor Company, 1987, pp. 1-90.

*Primary Examiner*—Dwight Diehl
*Attorney, Agent, or Firm*—Foley & Lardner, Schwartz, Jeffery, Schwaab, Mack, Blumenthal & Evans

[57] ABSTRACT

During non-shift modes of transmission operation, the line pressure is controlled according to a first control schedule. Upon a shift being initiated a second control schedule is used. The use of this schedule is maintained until such time as the ratio of the transmission input shaft rotational speed to the transmission output shaft rotational speed reaches a predetermined limit whereafter a third control schedule is utilized. Control is switched from the third control schedule to the first one upon the expiration of a predetermined period which is timed from the point in time a decision that a shaft between gears of the transmission should be implemented.

10 Claims, 7 Drawing Sheets

LINE PRESSURE CONTROL ARRANGEMENT FOR AUTOMATIC AUTOMOTIVE TRANSMISSION

BACKGROUND OF THE INVENTION

1. Field of the Invention

The present invention relates generally to a line pressure control arrangement for automatic automotive transmissions and more specifically to a line pressure control arrangement which enables the appropriate control of line pressure during a plurality of different shifting operations.

2. Description of the Prior Art

An automatic transmission Service Manual (publication A261C07) issued in March 1987 relating to the so called RE4RO1A type transmission describes an arrangement which utilizes tabled data for controlling the line pressure during shifting and non-shifting modes of transmission operation. In this arrangement the engine throttle valve opening degree is used to determine the duty cycle of a signal used to control a line pressure control solenoid valve.

However, with this arrangement because the line pressure is controlled by a single throttle valve position-line pressure relationship during shifting operations it has been found to be very difficult to successfully control the line pressuring during all of the various shift possibilities.

For example, when the transmission undergoes a power OF upshift with the engine throttle valve held in a given position, and the transmission shifts from first to third (1-3) and shifts again from third to fourth (3-4), the ratio of the transmission input shaft rotational speed to the transmission output shaft rotational speed undergoes a large change. Accordingly, the line pressure correction must similarly undergo a large change.

Further, when the vehicle is coasting with the throttle valve fully closed and when the transmission undergoes a power OFF 1-2 upshift, a one-way clutch which is included in the transmission gear train assumes a released position and idles while the engagement line pressure level is low. An accumulator which is designed to maintain the line pressure at a reduced level during this particular shift in a manner which attenuates shift shock at higher loads, strokes slowly due to the low line pressure and induces the problem that, following the completion of the shift, the line pressure is not induced to undergo a sharp increase as the pressure reducing function of the accumulator is subject to an insufficiently termination. This leads to the situation wherein the friction elements tend to become engaged with a force which is insufficient and which can permit excessive slippage under the instant set of operating conditions.

SUMMARY OF THE INVENTION

It is an object of the present invention to provide a line pressure control system which can overcome the above described type of problems and which can selectively control the line pressure to appropriate levels during each of the various shifts which occur.

In brief, the above objects are achieved by an arrangement wherein, during non-shift modes of transmission operation, the line pressure is controlled according to a first control schedule. Upon a shift being initiated a second control schedule is used. The use of this schedule is maintained until such time as the ratio of the transmission input shaft rotational speed to the transmission output shaft rotational speed reaches a predetermined limit whereafter a third control schedule is utilized. Control is switched from the third control schedule to the first one upon the expiration of a predetermined period which is timed from the point in time a decision that a shift between gears of the transmission should be implemented.

More specifically, a first aspect of the present invention is deemed to comprise an automatic transmission which features: shift control unit the shift control unit including first and second solenoids which are selectively energizable in manner to control the delivery of line pressure to the friction elements of the transmission; a line pressure control solenoid; line pressure control unit for controlling the line pressure control solenoid; first, second and third line pressure control schedules, the first, second and third schedules being stored in a memory and recorded in terms of a ratio of the rotational speeds of the input shaft of the transmission to the rotational speed of output shaft of the transmission, and a load parameter which varies with the torque applied to the input shaft of the transmission, the first second and third line pressure control schedules being recorded in a memory included in the line pressure control unit the line pressure control unit being responsive to the operation of the shift control unit and arranged to use the first line pressure control schedule when the transmission is operating in a mode where shifting of the gears thereof is absent and for sequentially using the second and third line pressure control schedules when the transmission enters a mode of operation wherein a shift between gears of the transmission is occurring.

The above mentioned arrangement is further characterized in that the line pressure control unit uses the second line pressure control schedule from the time the shift between gears initiates to a time where one of the first and second shift control solenoid energizations is changed, then uses the third line pressure control schedule until the expiration of a time period which begins with the decision to implement a shift in transmission gears, then uses the first line pressure control schedule.

A second aspect of the invention is deemed to comprise a vehicle which features: an engine, the engine having a throttle valve; a transmission, the transmission being operatively operated with the internal combustion engine, the transmission having an input shaft and an output shaft; first and second sensors for sensing the rotational speed of the input shaft and the output shaft of the transmission, respectively; a third sensor for sensing the position of the throttle valve; a plurality of friction elements, the friction elements being selectively engageable to produce a plurality of gears; a source of line pressure which supplies hydraulic fluid under pressure via which the friction elements are engaged; a line pressure control solenoid, the line pressure solenoid being arranged to be operated by a control signal the duty cycle of which is selectively variable, the line pressure solenoid being arranged so that the line pressure increases with increase in the duty cycle of the control signal; a memory in which line pressure control data is stored, the line pressure control data comprising: a first line pressure control schedule, the first line pressure control schedule being recorded in terms of duty cycle and throttle position, the first line pressure control schedule being designed for use when the transmission is operating under a non-shifting mode; a plurality of second line pressure control schedules, the second line pressure control schedules being recorded in terms of duty cycle and throttle position, the second line pressure control schedules being designed for use when the transmission is undergoing a shift between gears; a control circuit, the control circuit being responsive to the first, second and third sensors, the control circuit being operatively connected with the memory, the control circuit being arranged to produce the control signal, the control circuit being arranged to determine the presence of a non-shifting mode of transmission operation and to use the first line pressure control schedule to determine the duty cycle of the line pressure control signal, the control circuit being arranged to determine the presence of the transmission undergoing a shift operation and for selectively using the plurality of second line pressure control schedules to determine the duty cycle of the control signal.

A third aspect of the invention is deemed to comprise an automatic transmission which features: first and second shift control solenoids; a line pressure control solenoid; first and second rotational speed sensors for sensing the rotational speed of an input shaft and an output shaft of the transmission, respectively; a load sensor, the load sensor being operatively connected with the input shaft of the transmission, the load sensor being arranged to sense a parameter which varies with the power applied to the input shaft; a memory in which data is recorded, the data including: a first line pressure control schedule, the first line pressure control schedule being recorded in terms of duty cycle and load, the first line pressure control schedule being designed for use when the transmission is operating under a non-shifting mode; a plurality of second line pressure control schedules, the second line pressure control schedules being recorded in terms of duty cycle and load, the second line pressure control schedules being designed for selective use when the transmission is undergoing a shift between gears; a plurality of shift solenoid control schedules, each of the shift solenoid control schedules being recorded in terms of gear ratio and load; and a control circuit, the control circuit being operatively connected with the first and second rotational speed sensors and the load sensor for receiving data therefrom and operatively connected with the first and second shift control solenoids and the line pressure control solenoid, the control circuit including means for: comparing the rotational speeds of the input and output shafts and for developing a ratio; selecting one of the plurality of shift control schedules; comparing the ratio with the selected shift control schedule; controlling the energizations of the first and second shift solenoids in accordance with the comparison; selecting the first line pressure control schedule when the transmission is detected as undergoing a non-shift mode of operation; and selecting one of the plurality of second line pressure control schedules when the transmission is detected undergoing a shift between gears.

DETAILED DESCRIPTION OF THE PREFERRED EMBODIMENT

Figure 1:
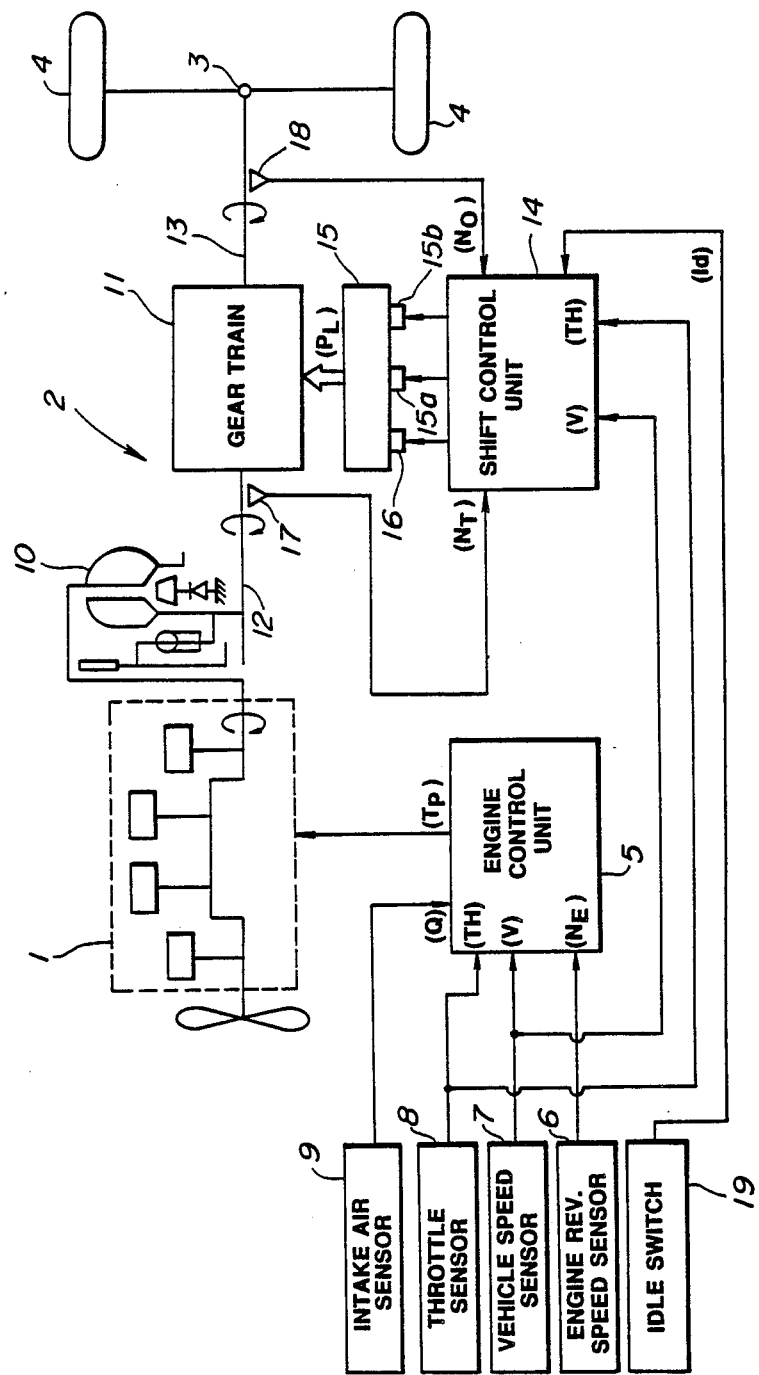
FIG. 1 is a schematic drawing showing an automotive power train which is equipped with an embodiment of the present invention.

FIG. 1 shows a power train to which an embodiment of the present invention is applied. In this arrangement an electronically fuel injected internal combustion engine 1 is operatively connected by way of a power train (generally denoted by the numeral 2) with a differential gear 3. Driving wheels 4 are connected to the differential 3.

It should be understood that even though FIG. 1 shows a F-R power train (front engine-rear wheel drive) the present invention is not limited to the same and can be applied to FF, MR or four-wheel drive 4WD type arrangements if so desired.

The engine control system includes an engine control unit 5 which is supplied inputs from an engine speed sensor 6, a vehicle speed sensor 7, a throttle position sensor 8, and an intake air sensor 9.

Based on the inputs of sensors 6 to 9, the control unit 5 which in this instance includes a microprocessor (not shown), derives the appropriate injection control pulse width and applies the same to the fuel supply system of the engine.

In this embodiment, the power train 2 includes a RE4RO1A type transmission developed by NISSAN MOTOR CO. LTD., the contruction and arrangement of which is described in detaile in the Service Manual A261CO7 published by the above mentioned company (see Hayaskai, U.S. Pat. No. 4,680,922, issued on Jul. 21, 1987).

A torque converter 10 including a lock-up clutch provides an operative connection between the output shaft of the engine and an input shaft 12 of a gear train 11. A transmission output shaft 13 provides a drive connection between the differential or final gear 3 and the transmission.

The system includes a shift control unit 14 which also includes a microprocessor. This unit 14 is arranged to issue control signals to a control valve unit 15 which forms part of the transmission. The control valve unit 15 includes three solenoids 15a, 15b and 16.

In this embodiment the transmission includes a gear train comprising a plurality of planetary gear units, and associated hydraulically operated clutches and brakes (not shown). The brakes and clutches and operated by the supply of so called "line pressure" PL which is selectively supplied from the control valve unit 15.

Depending on the energization of solenoids 14a and 15b, the transmission is conditioned to selectively produce a number of different gear ratios by selectively inducing line pressure PL to be supplied to the appropriate friction elements.

In this instant arrangement four forward gear ratios of the transmission can be produced in the manner indicated in the table below.

TABLE 1

| GEAR: | FIRST | SECOND | THIRD | FOURTH |
|---|---|---|---|---|
| SOL. 15a: | ON | OFF | OFF | ON |
| SOL. 15b: | ON | ON | OFF | OFF |

The third solenoid 16 of the control valve unit 15 is arranged to be operated on a variable duty cycle and to control the level of the line pressure PL. With this arrangement as the duty cycle increases the level of the line pressure is increased.

The shift control unit 14 is arranged to receive data inputs NT and NO from rotational speed sensors 17 and 18 respectively. As will be appreciated from the drawings, NT is indicative of the rotational speed of the input shaft 12 of the transmission while NO is indicative of the rotational speed of the transmission output shaft 13.

It is worth noting that the output of the sensor 18 can be used additionally as a vehicle speed indicative signal if so desired.

This unit 14 further receives data inputs V, TH and Id from teh vehicle speed sensor 7, the throttle position sensor 8 and an idle switch 19.

Figure 2:
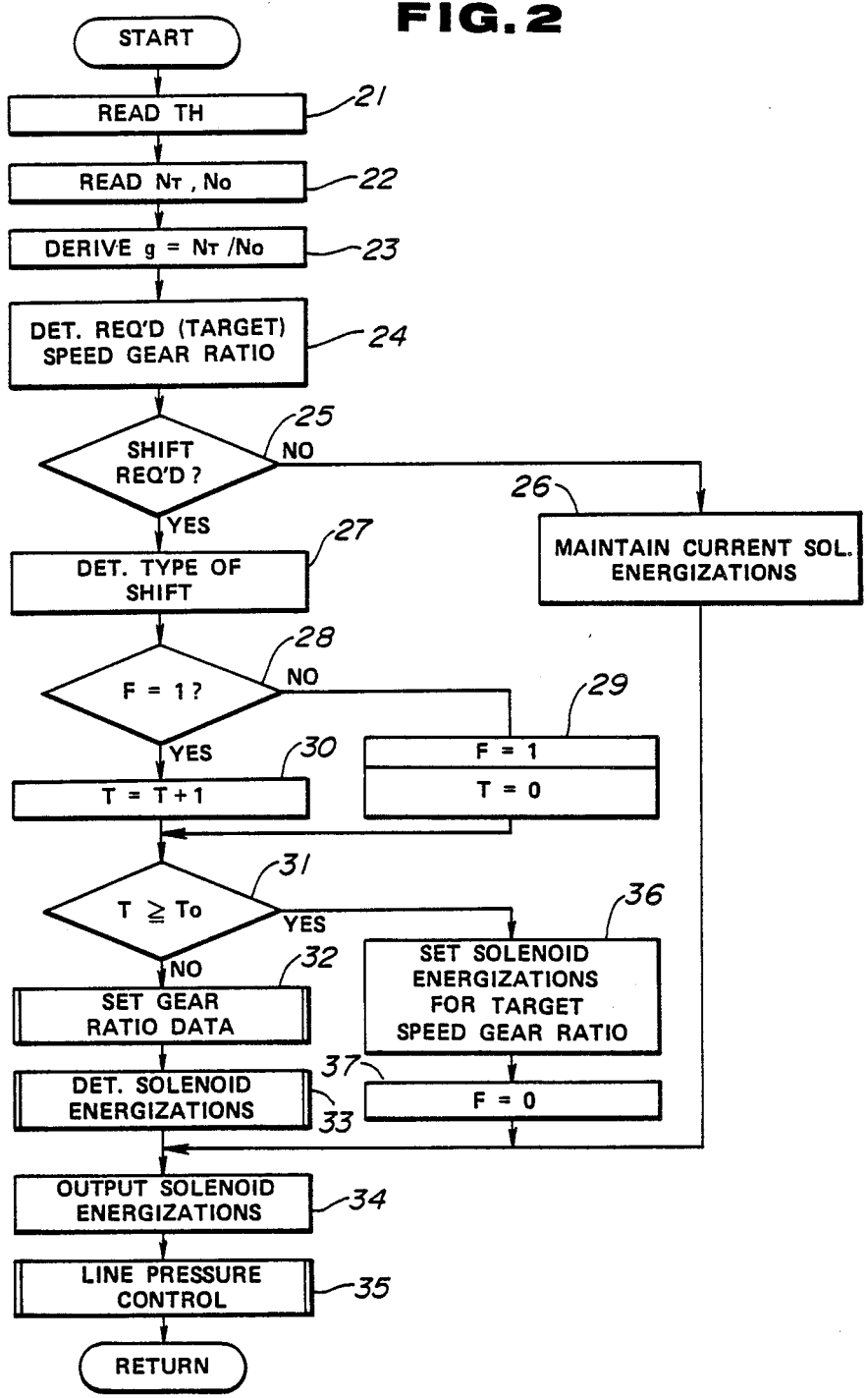
FIG. 2 is a flow chart depicting the steps which are executed by a main control routine during the operation of the embodiment of the present invention.
Figure 3:
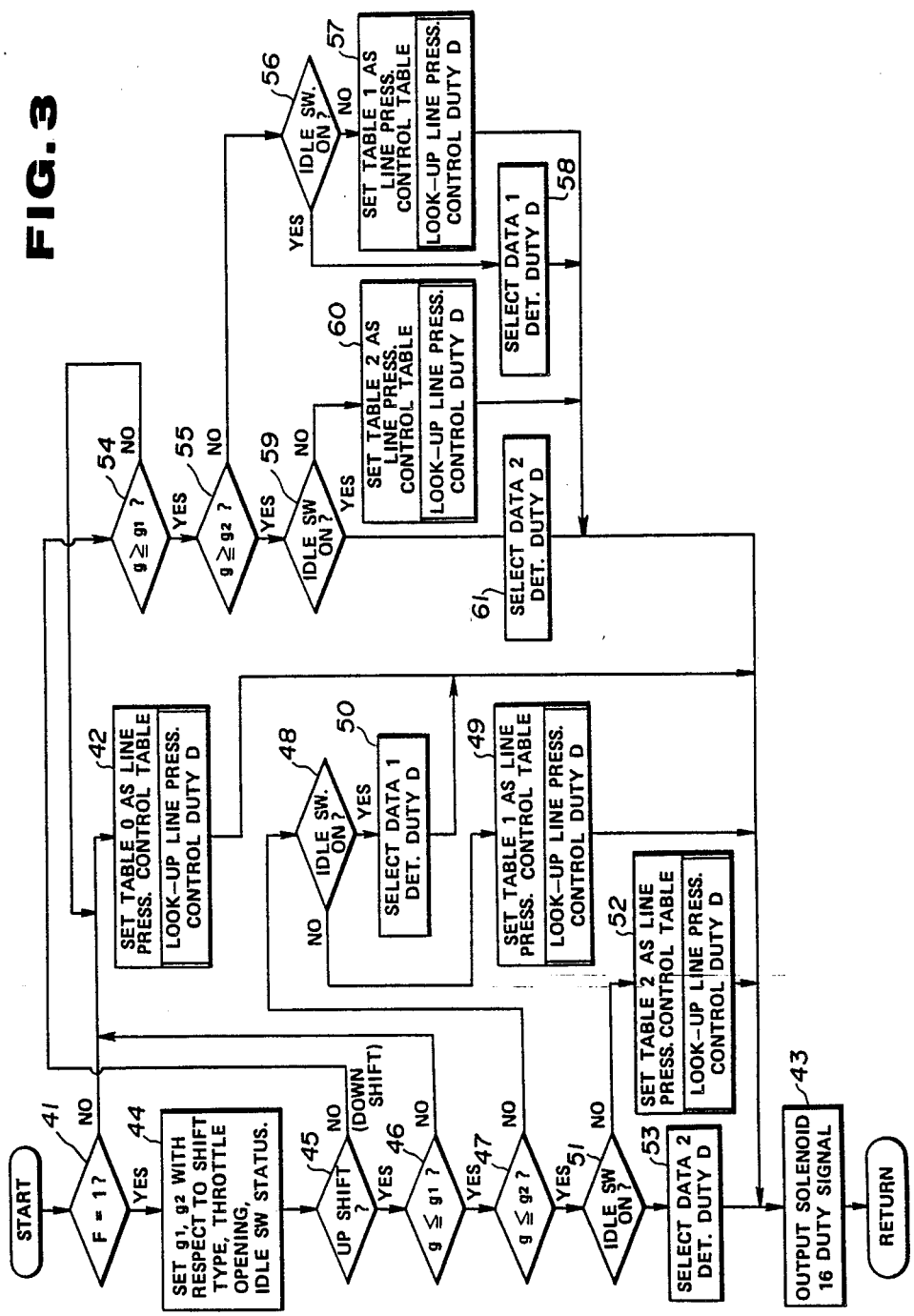
FIG. 3 is a flow chart depicting the steps which are executed in accordance with a sub-routine which is run in the main control shown in FIG. 2.

Programs of the nature depicted in the flow charts of FIGS. 2 and 3 are run in the shift control unit microprocessor in order to derive the appropriate control signals. In this embodiment the main control routine shown in FIG. 2 is arranged to be run at 10 msec intervals (by way of example).

FIG. 2 depicts the main control routine in flow chart form. At steps 21 and 22 of this routine, the outputs of sensors 8, 17 and 18 are sampled and the instant values of TH, NT and NO are read and set in memory for further processing. At step 23 the ratio g of the transmission input shaft speed to the transmission output shaft speed is derived. Following this, in step 24 the output of the vehicle speed sensor 7 is sampled and the instant value of V read into memory. This data is then used in combination with the instant throttle valve position TH to determine, from shift pattern table data, the most appropriate gear (i.e. speed gear ratio) for the transmission to be conditioned to produce. This is logged as a target gear.

At step 25 the instant gear the transmission is conditioned to produce is compared with the target one. If there is no difference, the program flows to step 26 wherein a command which maintains the current energization status of the solenoids 15a and 15b is issued and the routine then proceeds to steps 34 and 35 where energization signals are outputted to the solenoids and a line pressure sub-routine is performed. Note that this just mentioned sub-routine will be described later in connection with the flow chart shown in FIG. 3.

However, if at step 25 it is discovered that there is a difference between the target and current one the transmission is conditioned to produce, then the routine flows to step 27 wherein the type of shift which must be implemented to achieve the target value is determined. By way of example, it may be found that a 1-4 upshift is required.

Next, at step 27 the instant status of a shift flag F is determined. If the value of this shift flag is not "1" then the routine flows across to step 29 where the value is set to 1 and a timer count T set to zero. Following this, the program loops to step 31. On the other hand, if the outcome of the enquiry conducted at step 28 is affirmative, then at step 30 the count of timer T is incrementally increased.

Step 31 is arranged to check the count of timer T and to determine if a predetermined period of time has elapsed or not. While this period has not elapsed the routine flows to steps 32 and 31.

Figure 4A:
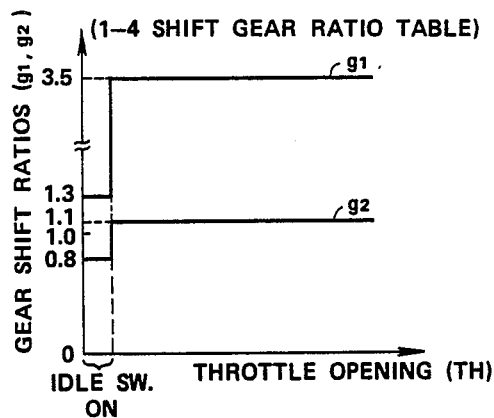
FIGS. 4A and 4B are charts showing, in terms of engine throttle valve opening and gear shift ratio values g1 and g2, the control characteristics which are used during 1-4 and 1-2 upshifts, respectively.
Figure 4B:
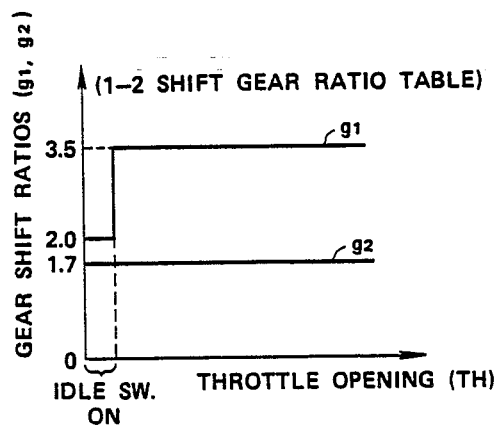
Figure 5A:
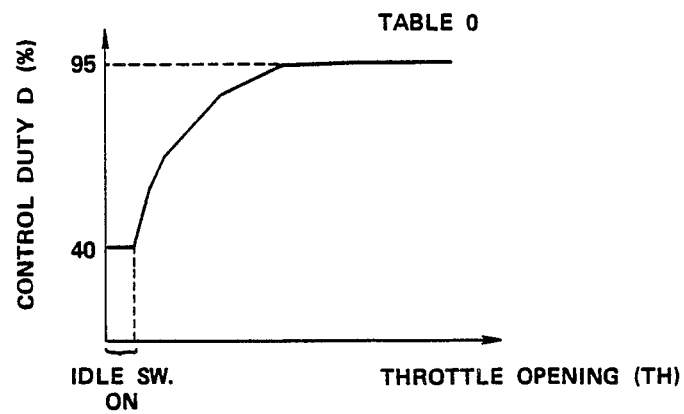
FIG. 5A is a table which shows in terms of throttle opening and duty cycle, a basic line pressure control schedule which is used during before and after a shift control operation is conducted.
Figure 5B:
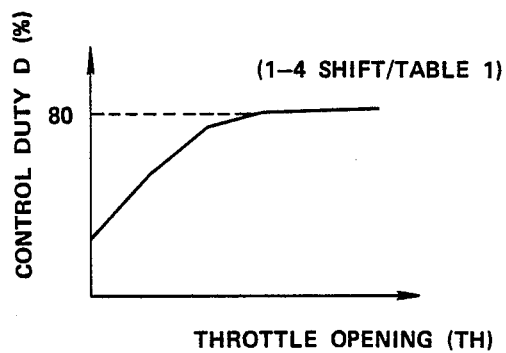
FIGS. 5B and 5C show tables which depict the duty cycle control schedules used during 1-4 upshifts.
Figure 5C:
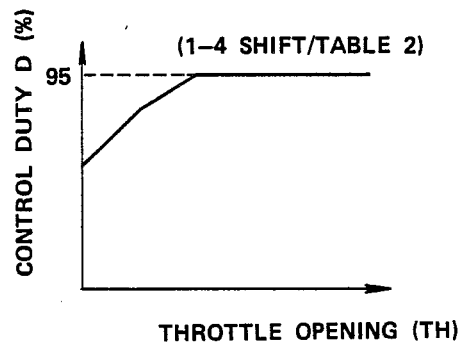
Figure 5D:
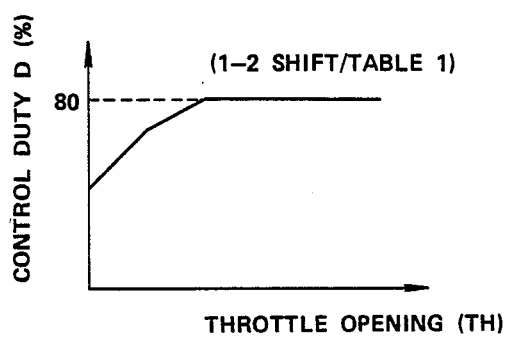
FIGS. 5D and 5E show tables which depict the duty cycle control schedules used during 1-2 upshifts.
Figure 5E:
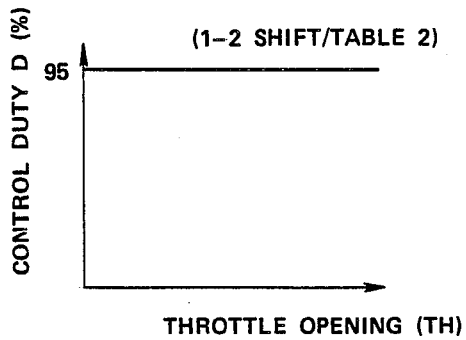

In step 32 the gear ratio data necessary to implement the shift which is indicated as being necessary in step 27 is read out of memory. For example, if a 1-4 upshift is indicated as being necessary the data such as that depicted in FIG. 4A is read out of memory and installed ready for use.

At step 33 the instant value of g is compared with the values of g1 and g2 of the data prepared in step 32. For example, if the instant value of g is between g1 and g2 then the solenoids are de-energized in step 34 (see the 1-4 power ON upshift timing chart—FIG. 6).

Until timer T has reached the To count, the routine continues to flow through steps 32 to 34. Accordingly, as each run is made the instant value of g is updated until it becomes equal to or less than g2. At this time the solenoid conditioning is revised. For example in the case of a 1-4 upshift with power "on", solenoid 15a is re-energized. This particular operation changes the shifting of the transmission from a 1-3 to a 3-4 shift in the manner shown in FIG. 6.

When timer T has reached the count To indicative of the above mentioned period having elapsed (step 31), the flow of the routine changes and it then flows across to step 36 where the post shift decision solenoid energization settings, which are necessary to condition the transmission to produce the target gear, are issued.

For further information relating to the type of operations which are performed in the above mentioned steps 32 and 33 reference can be made to copending United States Patent Application which was filed on Mar. 29, 1989 in the name of Yasushi NARITA which claims a priority based on Japanese Patent Application No. 63-73460 filed on Mar. 29, 1988 by the same entity as the instant application is assigned. The content of this document is hereby incorporated by reference thereto.

FIG. 3 shows a flow chart which depicts the steps performed by the line pressure control sub-routine which is run at step 35. As will be appreciated the first step of this routine is such as to determine the instant status of the shift flag F. In the event that the shift flag has not been set to "1" then the routine flows across to step 42 where Table 0 is read out and set as the instant line pressure control table. The appropriate duty cycle to be applied to solenoid 16 is then looked up. Following this, the routine flows to step 43 wherein the appropriate control signal is applied to the line pressure control solenoid. It will be noted that while shift flag F is not set to "1" the transmission is indicated as operating in a non-shift mode. Under these modes of operation Table 0 provides the appropriate line pressure control characteristics.

On the other hand, if the shift flag F has been set to "1" indicating that a shift mode has been entered, then the program flows to step 44. In this step the instant g1 and g2 values which will be used for the solenoid energization control are established on the basis of the type of shift which is indicates as being necessary, the throttle position TH and the status of the idle switch. These values are set in memory ready for further processing.

It will be noted that in the case of upshifts g1>g2 while in the case of downshifts, the reverse situation occurs viz., g2>g1.

Next, in step 45, the type of shift which is apt to be induced by the instant set of operating conditions is screened in a manner which enables it to be determined if the shift will be an upshift or not. In the case of an affirmative outcome, the routine proceeds to step 46 wherein it is determined if the instant g value is less than or equal to g1. In the case of an affirmative outcome the routine proceeds to step 47 wherein the instant value of g is compared with g2 in a manner which determines if it is less than or equal to the same.

In the case of a negative outcome in step 46 the routine flows to step 42, it being indicated that the system is operating in a quasi non-shift mode and induces the use of Table 0 for the line pressure control. On the other hand, in the case of a negative outcome in the enquiry conducted in step 45 the routine goes to step 48 where the instant status of the idle switch is determined. In the case where the switch is ON the routine proceeds to step 50 wherein a duty cycle deemed suitable for the instant set of circumstances is established using tabled data entitled DATA 1. Following this the routine proceeds to step 43 wherein the duty cycle selected is implemented.

In this embodiment, the two sets of data (DATA 1, and DATA 2 of the nature set forth below in Table 2) are stored in ROM.

TABLE 2

| DATA 1 | | DATA 2 | |
| --- | --- | --- | --- |
| SHIFT | DUTY | SHIFT | DUTY |
| 1-2 | 50% | 1-2 | 95% |
| 1-4 | 40% | 1-4 | 50% |

In the case where the outcome of the inquiry conducted at step 48 reveals that the idle switch in not ON then at step 49 table 1 for the instant shift is set as the line pressure duty cycle control table, and the appropriate duty for the instant throttle opening degree TH (viz., the value recorded in step 21) is determined by look-up.

In the case where the routine flows to step 51, the idle switch status is checked. In the event that it is not ON, the routine flows to step 52 where the Table 2 data for the instant type of shift (viz., 1-2 or 1-4) is set as the duty cycle for this signal by which the line pressure solenoid 16 is operated. The appropriate duty cycle is then determined using the instant value of TH. However, in the event that the idle switch is found to be ON, then at step 53 DATA 2 is used to set the line pressure control duty cycle.

Steps 54 to 61 are essentially similar to steps 45 to 53 and are arranged to screen the instant value of g against g1 and g2 as set in step 44, and to induce the use of TABLES 1 or 2 of the use of DATA 1 or 2 as the situation demands.

Figure 6:
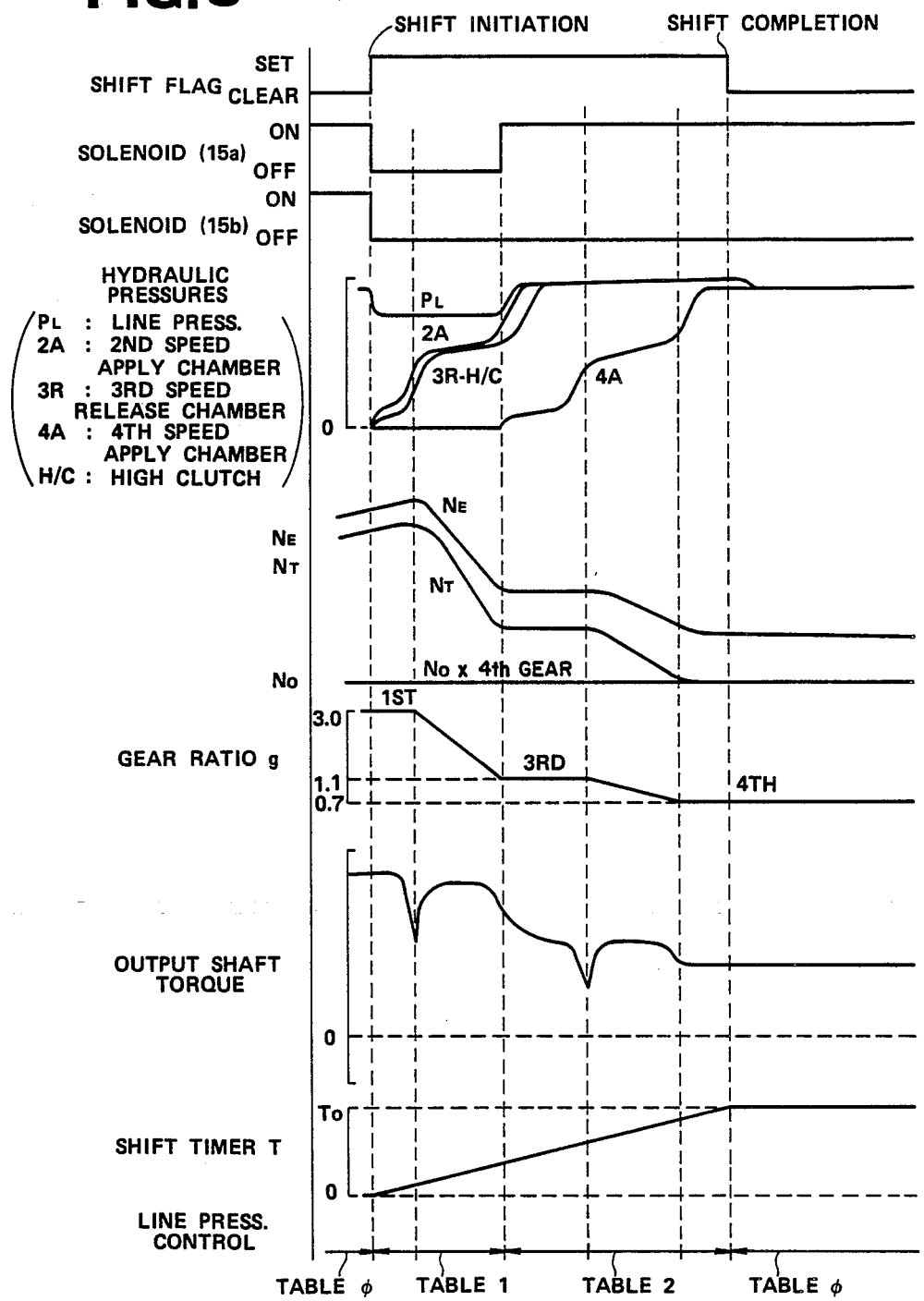
FIG. 6 is a timing chart which shows the operation induced by the present invention during a 1-4 power ON upshift.
Figure 7:
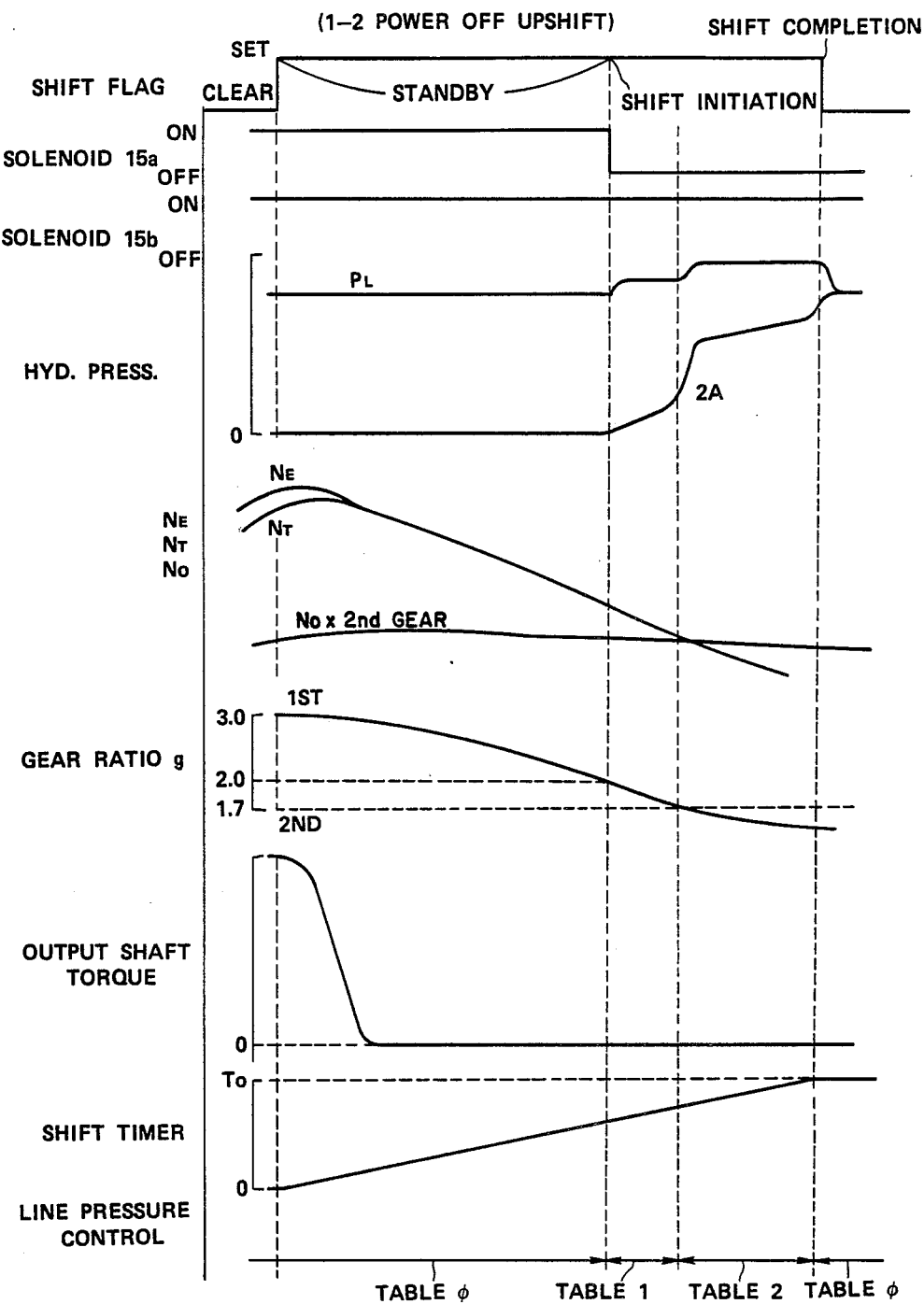
FIG. 7 is a timing chart which shows the operational characteristics induced by the present invention during a power OFF 1-2 upshift.

The control provided by the instant embodiment of the invention is deemed to be clear from the timing charts of FIGS. 6 and 7. As will be noted at the bottom of these charts, Table 0 is used when the system is not undergoing a shift, while once in a shift mode, the appropriate Table 1 data is used until such time as the g value reaches the g2 level. Following this event the appropriate Table 2 data is used to control the level of the line pressure. The effect of this type of control is demonstrated by the trace PL which forms part of the "hydraulic pressure" section of the charts.

In the case of the 1-2 power OFF upshift shown in FIG. 7, until the value of g falls to that of g2 the line pressure control continues to be determined by the schedule defined in Table 0 and remains at the same level as that used during non-shift modes of transmission operation during the "standby" period, as no change in the shift control solenoids 15a and 15b is induced during the same.

The time period for which timer T is arranged to count is fixed at a single value which is selected to correspond to the period which is required for any given shift to be completed. As will be noted, in the case of the 1-4 shift shown in FIG. 6, the pressues in the various chambers of the friction elements have already finished increasing when time To is reached. On the other hand, in the case of a 1-2 shift the pressure in the second speed apply chamber 2A is still increasing at the time when timer T completes is count. However, as will be noted the pressure is sufficiently high as to ensure that sufficient engagement of the friction element in question, is produced (not that this is a power OFF type shift).

As will be appreciated from the above, Table 0 is designed for fully engaged friction element operation (viz., non-transistory or non-shift modes) and arranged to produce the appropriate engagement pressure level with respect to the load being applied (indicated by the engine throttle valve setting).

Although the timing charts show only two of the number of different shifts which are possible and are restricted to upshifts, it will be apparent to those skilled in the art to which the present invention pertains, that a similar type line pressure control can be implemented during downshifts in addition to upshifts and that, in light of the above disclosure, the necessary tables and programs required could be compiled without undue experimentation.

What is claimed is
1. An automatic transmission, comprising:
shift control means, said shift control means including first and second solenoids which are selectively energizable in a manner to control delivery of line pressure to the friction elements of said transmission;
a line pressure control solenoid;
line pressure control means for controlling said line pressure control solenoid;
first, second and third line pressure control schedules, said first, second and third schedules being stored in a memory and recorded in terms of a ratio of rotational speeds of an input shaft of said transmission to the rotational speed of an output shaft of said transmission, and a load parameter which varies with torque applied to the input shaft of said transmission, said first second and third line pressure control schedules being recorded in a memory included in said line pressure control means, said line pressure control means being responsive to the operation of said shift control means and arranged to use said first line pressure control schedule when said transmission is operating in a mode where shifting of gears thereof is absent and for sequen- tially using said second and third line pressure control schedules when said transmission enters a mode of operation wherein a shift between gears of said transmission is occurring.

2. A transmission as claimed in claim 1 wherein said line pressure control means uses said second line pressure control schedule from the time the shift between gears initiates to a time where one of said first and second shift control solenoid energizations is changed; uses said third line pressure control schedule until the shift is complete, and then uses said first line pressure control schedule.

3. A vehicular power train comprising:
an engine, said engine having a throttle valve;
a transmission, said transmission being operatively operated with said internal combustion engine by a torque transmitting coupling, said transmission having an input shaft, an output shaft, a gear train which operatively interconnects the input and output shafts and a plurality of friction elements which are operatively connected with the gear train and which are selectively engageable to induce a plurality of forward gear ratios;
first and second sensors for sensing rotational speed of said input shaft and said output shaft of said transmission, respectively;
a third sensor for sensing throttle valve position;
a source of line pressure which supplies hydraulic fluid under pressure via which said friction elements are engaged;
a line pressure control solenoid, said line pressure control solenoid being arranged to be operated by a control signal the duty cycle of which is selectively variable;
a memory in which line pressure control data is stored, said line pressure control data comprising:
a first line pressure control schedule, said first line pressure control schedule being recorded in terms of duty cycle and throttle position, said first line pressure control schedule being designed for use when the transmission is operating under a non-shifting mode;
a plurality of second line pressure control schedules, said second line pressure control schedules being recorded in terms of duty cycle and throttle position, said second line pressure control schedules being designed for use when the transmission is undergoing a shift between gears;
a control circuit, said control circuit being responsive to said first, second and third sensors, said control circuit being operatively connected with said memory, said control circuit being arranged to produce said control signal, said control circuit being arranged to detect a non-shifting mode of transmission operation and to use said first line pressure control schedule to determine the duty cycle of said line pressure control signal, said control circuit being arranged to detect the transmission undergoing a shift operation and to selectively use said plurality of second line pressure control schedules to determine the duty cycle of said control signal.

4. A vehicular power train as claimed in claim 3 wherein:
said transmission includes first and second shift control solenoids, said first and second shift control solenoids being operatively connected with first and second shift valves which selectively control the supply of line pressure from said source to said plurality of friction elements; and wherein
said control circuit sequentially uses said plurality of second control schedules and switches from one schedule to another in response to one of a change in the energization of said first and second shift control solenoids and a ratio of the rotational speed of the transmission input shaft to the rotational speed of the transmission output shaft reaching a predetermined value.

5. A vehicular power train as claimed in claim 4 further comprising a vehicle speed sensor, said control circuit being responsive to said vehicle speed sensor and said third sensor for determining a need to shift the gears of said transmission, said control circuit being further responsive to said determination to shift gears in a manner to initiate timing of a predetermined period, said contorl circuit being responsive to the expiration of said predetermined period in a manner to switch the line pressure control from said plurality of second control schedules to said first control schedule.

6. An automatic transmission operatively connected to a prime mover through a torque transmitting coupling device which selectively transmits torque from the prime mover to an input shaft of said transmission, said transmission comprising:
first and second shift control solenoids, said first and second shift control solenoids being arranged to selectively control a supply of line pressure to a plurality of friction elements included in a gear train which operatively interconnects the input shaft and an output shaft of said transmission;
a line pressure control solenoid for controlling the level of the line pressure which is supplied to the friction elements under the control of said first and second shift control solenoids;
first and second rotational speed sensors for sensing the rotational speed of the input shaft and the output shaft of said transmission, respectively;
a load sensor, said load sensor being operatively connected with the prime mover, said load sensor being arranged to sense a parameter which varies with the torque applied to said input shaft;
a memory in which data is recorded, said data including:
a first line pressure control schedule, said first line pressure control schedule being recorded in terms of duty cycle and load, said first line pressure control schedule being designed for use when the transmission is operating under a non-shifting mode;
a plurality of second line pressure control schedules, said second line pressure control schedules being recorded in terms of duty cycle and load, said second line pressure control schedules being designed for selective use when the transmission is undergoing a shift between gears;
a pluratlity of shift solenoid control schedules, each of said shift solenoid control schedules being recorded in terms of gear ratio and load; and
a control circuit, said control circuit being operatively connected with said first and second rotational speed sensors and said load sensor for receiving data therefrom and operatively connected with said first and second shift control solenoids and said line pressure control solenoid, said control circuit including means for:

comparing the rotational speeds of said input and output shafts and for developing a ratio;
selecting one of said plurality of shift control schedules;
comparing the ratio with the selected shift control schedule;
controlling the energizations of said first and second shift solenoids in accordance with the comparison;
selecting said first line pressure control schedule when said transmission is detected as undergoing a non-shift mode of operation; and
sequentially selecting said plurality of second line pressure control schedules when said transmission is detected undergoing a shift between gears.

7. In a vehicle
a vehicle speed sensor;
an engine;
an engine load sensor;
a transmission, said transmission including:
an input shaft operatively connected with said engine by way of a torque transmitting coupling;
an output shaft;
a gear train which operatively interconnects said input and output shafts and which is controlled by a plurality of friction elements, said friction elements being arranged such that selective engagement thereof produces four forward speeds; and
a transmission control system comprising:
a source of line pressure;
a source of essentially constant pilot pressure;
first and second shift valves for selectively controlling the supply of line pressure to the friction elements, said first and second shift valves having control chambers into which pilot pressure is selectively admissible;
first and second shift control solenoids which are arranged to be selectively switched from a first continuously maintained energization state to a second continuously maintained energization state in order to implement a shift between forward speeds of the transmission, said first and second shift control solenoids controlling the admission of pilot pressure into said control chambers;
shift determining means responsive to said engine load sensor and said vehicle speed sensor for determining when and what kind of shift is required;
means for determining a ratio representative of the rotational speeds of the transmission input and output shafts; and
means responsive to said shift determining means and said ratio determining means for controlling said first and second shift control solenoids, said control means including:
a memory in which data is recorded, said data including:
a first line pressure control schedule, said first line pressure control schedule being recorded in terms of duty cycle and load, said first line pressure control schedule being designed for use when the transmission is operating under a non-shifting mode;
a plurality of second line pressure control schedules, said second line pressure control schedules being recorded in terms of duty cycle and load, said second line pressure control schedules being designed for selective use when the transmission is undergoing a shift between gears;
a plurality of shift solenoid control schedules, each of said shift solenoid control schedules being recorded in terms of gear ratio and load; and
a control circuit, said control circuit being operatively connected with said first and second rotational speed sensors and said load sensor for receiving data therefrom and operatively connected with said first and second shift control solenoids and said line pressure control solenoid, said control circuit including means for:
comparing the rotational speeds of said input and output shafts and for developing a ratio;
selecting one of said plurality of shift control schedules;
comparing the ratio with the selected shift control schedule;
controlling the energizations of said first and second shift solenoids in accordance with the comparison;
selecting said first line pressure control schedule when said transmission is detected as undergoing a non-shift mode of operation; and
sequentially selecting said plurality of second line pressure control schedules when said transmission is undergoing a shift.

8. A vehicle as claimed in claim 7 wherein
a first of said plurality of second line pressure control schedules is selected when one of (a) said ratio reaches a predetermined value or (b) the energization status of one of said first and second shift control solenoids changes occurs; and wherein
a second of said plurality of second line pressure control schedules is selected when said transmission is undergoing a shift and one of (a) said ratio reaches a predetermined value or (b) the energization status of one of said first and second shift control solenoids changes occurs.

9. A vehicular power train comprising:
an internal combustion engine;
transmission, said transmission being operatively operated with said internal combustion engine by a torque convertor, said transmission having an input shaft, an output shaft, a gear train which operatively interconnects the input and output shafts and a plurality of friction elements which are operatively connected with the gear train and which are selectively engageable to induce said gear train to produce a plurality of forward gear ratios;
first and second sensors for sensing rotational speed of said input shaft and said output shaft of said transmission, respectively;
a third sensor for sensing engine load;
a source of line pressure which supplies hydraulic fluid under pressure via which said friction elements are engaged;
first and second shift control solenoids, said first and second shift control solenoids being operatively connected with first and second spool valves which selectively control the supply of line pressure from said source to said plurality of friction elements;
a line pressure control solenoid, said line pressure solenoid being arranged to be operated by a control signal the duty cycle of which is selectively variable, said line pressure solenoid being arranged to control a modulator valve which modulates the output of a pump to form said line pressure;
a memory in which line pressure control data is stored, said line pressure control data comprising:

a first line pressure control schedule, said first line pressure control schedule being recorded in terms of duty cycle and throttle position, said first line pressure control schedule being designed for use when the transmission is operating under a non-shifting mode;

a plurality of second line pressure control schedules, said second line pressure control schedules being recorded in terms of duty cycle and throttle position, said second line pressure control schedules being designed for use when the transmission is undergoing a shift between gears;

a control circuit, said control circuit being responsive to said first, second and third sensors and operatively connected with said memory, said control circuit being arranged to produce said control signal, said control circuit being arranged to ascertain the transmission undergoing a non-shifting mode of transmission operation and to use said first line pressure control schedule to determine the duty cycle of said line pressure control signal, said control circuit being arranged to ascertain said transmission undergoing a shift mode of operation and to selectively and sequentially use said plurality of second line pressure control schedules to determine the duty cycle of said control signal, said control circuit sequentially using said plurality of second control schedules and switching from one schedule to another in response to the occurrence of a predetermined phenomenon.

10. A vehicular power train as claimed in claim 9 further comprising means for determining vehicle speed, said control circuit being responsive to said vehicle speed determining means and said third sensor for determining a need to shift the gears of said transmission, said control circuit being further responsive to said determination to shift gears in a manner to initiate timing of a predetermined period, said control circuit being responsive to the expiration of said predetermined period in a manner to switch the line pressure control from said plurality of second control schedules to said first control schedule.

* * * * *